United States Patent Office.

BUTLER G. NOBLE, OF NEW YORK, N. Y.

Letters Patent No. 66,616, dated July 9, 1867.

IMPROVED EXTRACT OF SEA CLAMS.

*The Schedule referred to in these Letters Patent and making part of the same.*

TO ALL WHOM IT MAY CONCERN:

Be it known that I, BUTLER G. NOBLE, of the city and county of New York, and State of New York, have invented a new and useful Manufacture; and I do hereby declare that the following is a full and exact description of the manner and process of making and compounding the same, which will enable those skilled in the art to make and use the article.

I take common sea clams, of any variety, and, having removed them from their shells, and washed or rinsed them sufficiently to remove all grit or sand, I cut them up into small pieces. A quantity of fresh water, nearly their equivalent in bulk, is then added, and the whole boiled for about one hour. I then strain off the free liquor or juice, and subject the fibrous mass to pressure, to remove the remainder. The juice or liquor thus obtained I then subject to a process of evaporation at a temperature not exceeding 190° Fahrenheit, and as much lower as is practicable, until it is reduced to a thick paste, when I remove it to proper drying-chambers and reduce it to a state of dryness. The extract thus obtained is easily soluble in water, and contains all the essential elements of nutrition and flavor peculiar to the sea clam. It can be made into cakes of any size and form, or reduced to powder. In the process of making, salt, pepper, or other condiments may be added if desired.

The extract may be used in this form for the production of clam soup, by the addition of the proper quantity of water, or to enrich or flavor other soups, gravies, &c., or it may be employed for the production of a variety of dishes obvious to persons skilled in the art of cookery. As a modification of the above, I sometimes combine the liquor or juice of clams with the juices of meats and of oysters, vegetables, and farinaceous matters, and reduce all to a state of dryness. By these means I am enabled to modify the flavor and to produce in a concentrated and portable form a large amount of alimentary matter.

I do not confine myself to any peculiar form of apparatus for the production of these results; the same thing may be accomplished in many and obvious ways. Water-baths or open pans heated by steam, or the employment of vacuum-pans, are the most feasible modes. The prime object is to carry off the water at a low temperature, in order to more effectually preserve the aroma or flavor.

The extract, whether in cake or powder, seems unchangeable so long as kept dry.

I am aware that attempts have been made to preserve clams and render them portable by means of dessication, but my invention does not contemplate the use of the solid or fibrous part of the clam. The liquid portion only being employed, the fibre or solid parts, after the juice is extracted, are rejected as tasteless and useless for food.

I do not claim any form of dessicated or dried clams; but what I do claim, and desire to secure by Letters Patent, as my invention, is—

1. Reducing by evaporation the liquor or juice of sea clams, either alone or in combination with other alimentary material, to a state of dryness, substantially as and for the purposes herein set forth.

2. I claim as a new manufacture "solidified extract of sea clams," substantially as herein specified.

BUTLER G. NOBLE.

Witnesses:
  CHAS. E. NOBLE,
  O. H. KOPP.